US009021200B1

(12) United States Patent
Kushmerick

(10) Patent No.: US 9,021,200 B1
(45) Date of Patent: Apr. 28, 2015

(54) DATA STORAGE SYSTEM WITH PREDICTIVE MANAGEMENT OF PHYSICAL STORAGE USE BY VIRTUAL DISKS

(75) Inventor: Nicholas Kushmerick, Seattle, WA (US)

(73) Assignee: Decho Corporation, Pleasant Grove, UT (US)

( * ) Notice: Subject to any disclaimer, the term of this patent is extended or adjusted under 35 U.S.C. 154(b) by 981 days.

(21) Appl. No.: 13/165,172

(22) Filed: Jun. 21, 2011

(51) Int. Cl.
*G06F 12/00* (2006.01)
*G06F 13/00* (2006.01)
*G06F 13/28* (2006.01)
*G06F 12/02* (2006.01)
*G06F 3/06* (2006.01)
*G06F 9/50* (2006.01)

(52) U.S. Cl.
CPC .............. *G06F 12/02* (2013.01); *G06F 3/0604* (2013.01); *G06F 3/0647* (2013.01); *G06F 9/5077* (2013.01)

(58) Field of Classification Search
CPC ..... G06F 12/02; G06F 9/5077; G06F 3/0604; G06F 3/0647
USPC .................................................. 711/114, 165
See application file for complete search history.

(56) References Cited

U.S. PATENT DOCUMENTS

| 2006/0161752 A1* | 7/2006 | Burkey | 711/170 |
|---|---|---|---|
| 2007/0043923 A1* | 2/2007 | Shue | 711/170 |
| 2007/0294206 A1* | 12/2007 | Korman et al. | 707/1 |
| 2011/0099321 A1* | 4/2011 | Haines et al. | 711/103 |

* cited by examiner

*Primary Examiner* — Charles Rones
*Assistant Examiner* — Sidney Li
(74) *Attorney, Agent, or Firm* — BainwoodHuang

(57) ABSTRACT

A computer of a data storage system carries out user input-output requests for data of a set of virtual disks by performing back-end input-output requests to a set of overprovisioned storage devices providing underlying physical storage. A set of time series of utilization measures are continually generated and stored, with each reflecting an amount of a given virtual disk consumed by user data at a given time. The time series are used to generate predicted utilization measures, each being an estimate of an amount of a given virtual disk expected to be consumed by user data at a future time. A fullness probability measure is generated by aggregating the predicted utilization measures, and it reflects a probability that the set of overprovisioned storage devices will be fully consumed by user data at the future time. When the fullness probability measure is above a threshold value, then a system management operation is performed to change operation of the data storage system to avoid full consumption of the overprovisioned storage devices by the virtual disks. For example, the mapping of virtual disks to the overprovisioned storage device is changed in a manner reducing usage of the overprovisioned storage device. The mapping as changed is used for subsequent user input-output requests for data of the virtual disks.

22 Claims, 3 Drawing Sheets

DATA STORAGE SYSTEM WITH PREDICTIVE MANAGEMENT OF PHYSICAL STORAGE USE BY VIRTUAL DISKS

BACKGROUND

The invention is related to the field of data storage systems.

Data storage systems are known that provide so-called "storage as a service" operation in which storage capacity is given to users on a contract basis (e.g., a subscription). The service may be provided over a public network such as the Internet. In this model, users are presented with storage in the form of "virtual disks" that from the users' perspective have all the attributes of real physical storage devices, including for example respective total storage capacities and perhaps certain quality-of-service or QOS parameters. Each virtual disk is mapped to a region of a physical storage device where the underlying real physical storage is provided.

In storage systems including those providing storage as a service, it is known to use a technique called "overprovisioning" so that the sum of the storage capacities of a set of virtual disks that are assigned to a given storage device exceeds the storage capacity of the storage device. This technique exploits the knowledge that most or all users are not always using all the storage capacity of their respective virtual disks. With some knowledge or assumptions about actual usage patterns, a system operator assigns virtual disks to storage devices so that there is sufficient real physical storage capacity for expected actual usage.

SUMMARY

Overprovisioning can promote efficiency in the operation of a data storage system, because the amount of real physical storage actually deployed at a given time is related to actual usage rather than to the (generally much larger) potential usage of the virtual disks based on their defined capacities. Physical storage resources can be added only as necessary, reducing operational costs.

However, overprovisioning also requires management of the mapping of the virtual disks to the storage devices, to avoid a situation in which a storage device becomes full and its fullness is manifested to a user as failure of a virtual disk. It is known to perform such management in a manual fashion. A system operator uses software tools to monitor the usage of the storage devices, and based on this information the operator detects that a storage device is becoming full and thus some action is required with respect to the virtual disks mapped to that storage device. The operator may use other software tools to move one or more of the virtual disks to another storage device, which has the effect of creating free space on the storage device of concern. The moving of a virtual disk involves changing its mapping to the new storage device and also moving its data from the original storage device to the new storage device.

Manual management by a system operator of the mapping of virtual disks to storage devices in a storage system can have certain drawbacks. There are labor costs associated with the system operator. The management activity may not be fully regularized, creating opportunities for undesirable operating conditions to occur if monitoring and/or taking remedial action is not done in a timely way. The decision to deploy additional storage devices may not correctly reflect the actual change (generally growth) of consumption of the virtual disks, and thus may result in non-optimal configurations (either too little or too much added storage capacity).

A method of operating a computer of a data storage system is disclosed that monitors for and detects approaching fullness of a set of storage devices used to store data of a set of virtual disks, generally overcoming the above-discussed drawbacks of prior manual management approaches. The method is used in a data storage system that defines a set of virtual disks visible to users and a mapping of the virtual disks to a set of one or more "overprovisioned" storage devices of the storage system, where overprovisioned storage devices include physical storage media providing physical storage for a set of the virtual disks and have a storage capacity less than a sum of respective storage capacities of the virtual disks.

The method includes satisfying user input-output requests for data of the set of virtual disks by performing corresponding back-end input-output requests to the set of overprovisioned storage devices in accordance with the mapping. A set of time series of utilization measures of the virtual disks are continually generated and stored, with each utilization measure reflecting an amount of a respective virtual disk consumed by user data at a respective time over a past time interval. The time series of utilization measures are used to generate predicted utilization measures of the virtual disks, each predicted utilization measure being an estimate of an amount of a respective virtual disk expected to be consumed by user data at a future time. The future time of interest, which may be seen as a prediction horizon, may be selected based on any of a variety of factors, including for example the expected time required to deploy additional storage capacity.

A fullness probability measure of the set of overprovisioned storage devices is generated by aggregating the predicted utilization measures. The fullness probability measure reflects a probability that the set of overprovisioned storage devices will be fully consumed by user data at the future time. When the fullness probability measure is above a predetermined threshold value, a system management operation is performed which is directed at changing operation of the data storage system to avoid full consumption of the set of overprovisioned storage devices by the set of virtual disks. For example, the mapping of set of virtual disks to the set of overprovisioned storage devices is changed in a manner reducing usage of the set of overprovisioned storage devices by the set of virtual disks while permitting continued consumption of the set of virtual disks up to their respective storage capacities. The mapping as changed is then used in carrying out of subsequent user input-output requests for data of the set of virtual disks.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
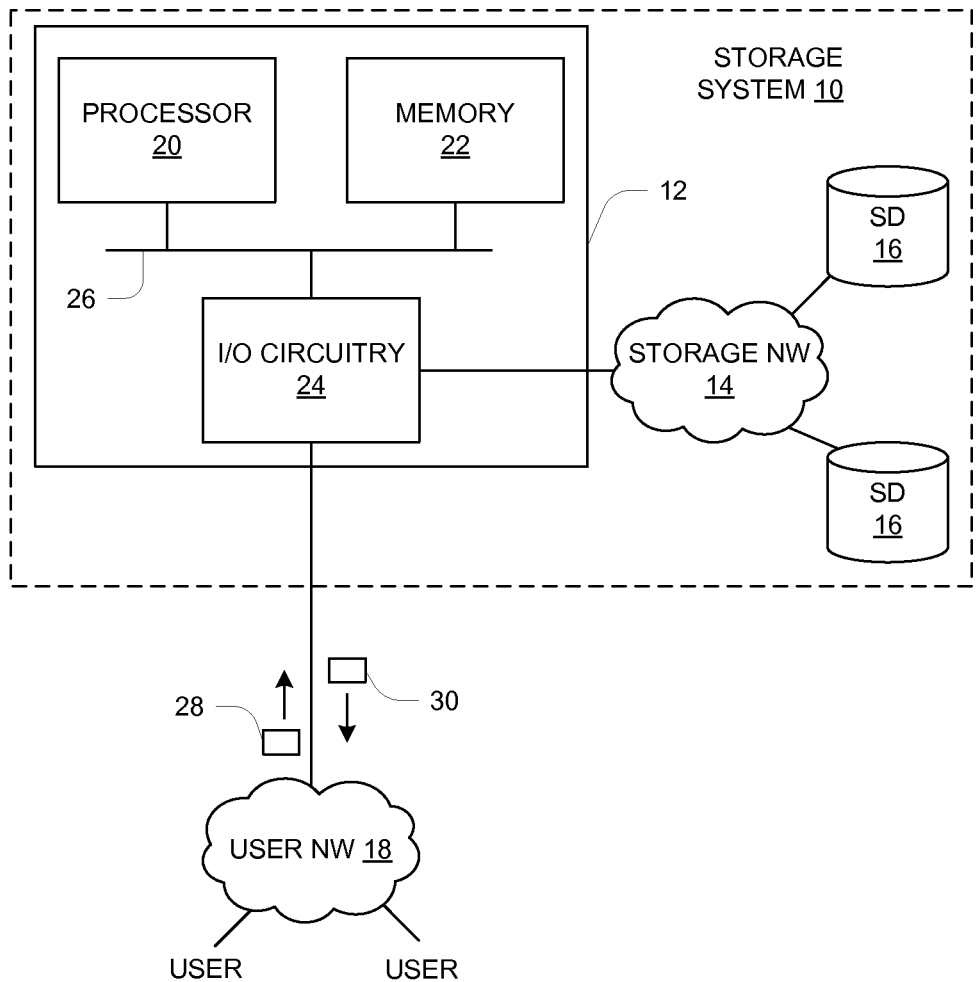
FIG. 1 is a block diagram of a data storage system.

FIG. 1 shows a storage system 10 as including a computer 12, a storage network 14 and storage devices (SDs) 16. The storage system 10 has connections through the computer 12 to one or more user networks 18 to which users of the storage system 10 are connected. The computer 12 is shown as including a processor 20, memory 22 and input-output (I/O) circuitry 24 connected together by interconnect 26 such as a high-speed data bus.

In one embodiment, the storage system 10 may be configured and operated according to a so-called "storage as a service" model, by which storage capacity is offered to a set of remote users. A storage as a service system may be operated and administered within an organization or association, or it may be provided in a more public manner, such as by subscription from members of the public. In the latter model, the user network 18 may be the public Internet or a similar public or quasi-public network. A user enters into a contract with a storage service provider to obtain one or more "virtual disks" representing an agreed amount of data storage capacity available to the user for a specified cost. In many cases, the agreement may also specify certain "quality of service" parameters, such as access times and availability ("up-time"). As described more below, the storage system 10 provides an interface by which the users can access their respective virtual disks, and it stores the user data on the storage devices 16.

The storage network 14 may be any of a variety of known network types using storage-oriented protocols and operations. In one embodiment it may be a so-called "storage area network" or SAN employing FibreChannel or iSCSI communications protocols for example. In some embodiments, the storage devices 16 may be directly attached to computer(s) 12 of the storage system via short-length system I/O buses, in which case a storage network 14 may not be utilized. The storage devices 16 are hardware devices containing data storage media of some type. One typical storage device 16 is referred to as a disk drive and utilizes one or more disks coated with a magnetizable thin film and electronic circuitry for writing and reading patterns of magnetization to/from the magnetizable film. A storage device 16 may employ semiconductor memory as a data storage medium, such as an array of electrically erasable non-volatile memory devices commonly referred to as "flash" memory. Other types of physical storage media may be utilized. The computer 12 of FIG. 1 is programmed with instructions stored in the memory 22 and executed by the processor 20 to cause the computer 12 to perform storage operations and provide a storage service accessed by the remote users using storage requests and responses. In operation, the computer 12 receives I/O requests 28 (read or write commands directed to user virtual disks) from the users via the user network 18, employs a mapping to identify a storage device 16 (and storage area thereof) where data for a target virtual disk specified in a request is located, performs back-end I/O operations on the storage devices 16 to read and write user data as part of carrying out the user I/O requests 28, and returns I/O responses 30 to the users. More specifically, a received write request 28 results in writing the data of the write request to a storage device 16 according to the mapping for the target virtual disk, and a received read request 28 results in reading data from a storage device 16 according to the mapping for the target virtual disk and returning a response 30 including the read data to the requesting user. Additional details of this operation are provided below.

Figure 2:
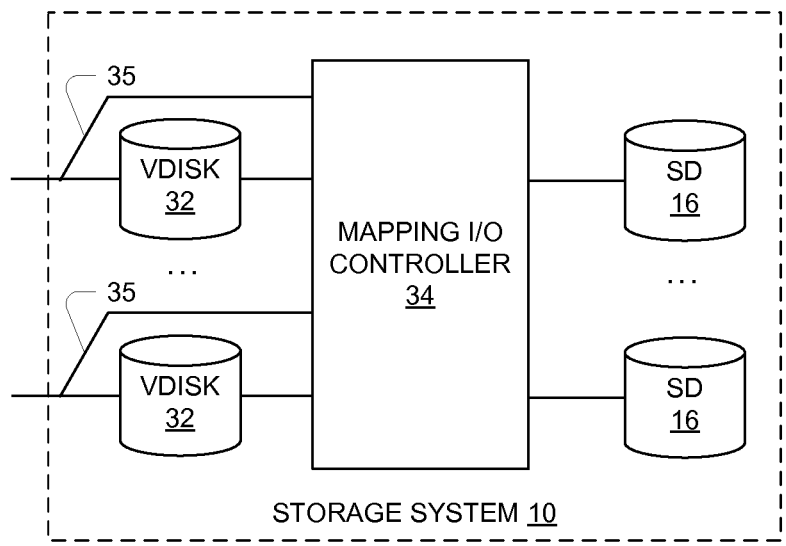
FIG. 2 is a functional block diagram of a computer in a data storage system.

FIG. 2 shows the data storage system 10 from a functional or operational perspective. The instructions executing on the computer 12 define virtual disks (VDISKs) 32 and a mapping I/O controller 34. A virtual disk 32 is a software interface to a unit of storage made available to a user, mapping to underlying physical storage provided by one or more storage devices 16. From a user's perspective, a virtual disk 32 appears as a real storage device. It is the target of storage I/O requests 28, and it has a variety of attributes or parameters of the same type generally possessed by real storage devices. The mapping I/O controller 34 is a set of functions and data implementing storage functionality including functionality described herein.

Also shown in FIG. 2 are separate control channels or interfaces 35 between the users and the mapping I/O controller 34, apart from the virtual disks 32, for the exchange of service-related messaging including requests by the users for creation of virtual disks 32. In one embodiment such an interface 35 may be realized by a user-interface web application of the type often used in online commerce.

Figure 3:
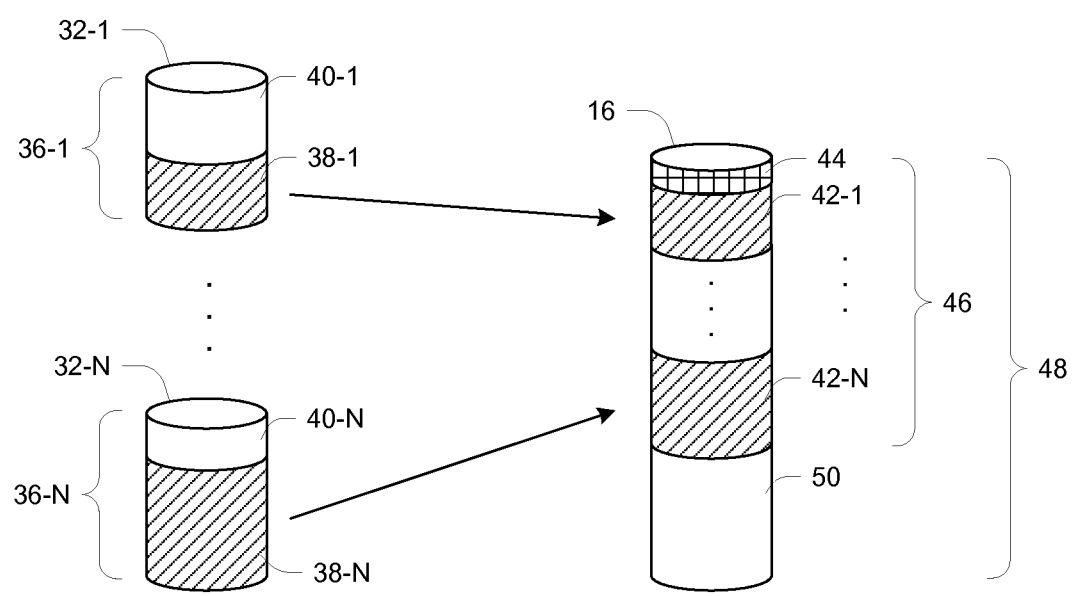
FIG. 3 is a schematic depiction of a mapping of virtual disks to a storage device.

FIG. 3 illustrates an example mapping of virtual disks 32 to a storage device 16, the mapping being maintained and used by the mapping I/O controller 34 in the processing of storage I/O requests 28 from the users. The virtual disks 32 are shown at left, enumerated as 32-1 through 32-N. Each virtual disk 32 is shown as having a respective capacity 36 (36-1 through 36-N), and at any given time each virtual disk 32 has a respective consumed area 38 which is a portion of the virtual disk 32 actually "storing" user data at that time (i.e., for which there is user data stored on the storage device 16 and accessible via the virtual disk 32). A virtual disk 32 may also have unused area 40. As shown, each consumed area 38 is mapped to a corresponding region 42 of the storage device 16, with the set of all regions 42 and an overhead area 44 constituting a consumed area 46 of the storage device 16. The overhead area 44 stores metadata pertaining to the virtual disks 32 used by the mapping I/O controller 34 in operation. The storage device 16 has an available capacity 48 which is the sum of the size of the consumed area 46 and the size of an unused area 50 available to store user data.

It should be noted that the above-discussed mapping is represented in FIG. 3 by the arrows extending from the virtual disks 32 to the areas 42 of the storage device 16. It will be appreciated that in practice this mapping may be realized in any of a variety of ways, generally using a data structure that creates one or more associations between each of one or more addressed regions of each virtual disk 32 and a corresponding addressed region of the storage device 16. The construction and use of such mapping data structures is generally known in the art. As described herein, the presently disclosed technique can include dynamically changing the mapping of virtual disks 32 to storage devices 16 so as to meet certain operational goals. It should be noted that the areas identified by references 38 and 42 need not be, and generally may not be, single contiguous extents. The depiction in FIG. 3 is used to distinguish storage space that is currently consumed or utilized for user data (areas 38, 40) from storage space that is currently unused for user data (areas 40, 50)—it does not necessarily represent an actual organization of data on a virtual disk 32 or storage device 16.

It is assumed that the storage device 16 of FIG. 3 is "overprovisioned", meaning that its capacity 48 is less than the sum of the capacities 36 of the virtual disks 32 that are mapped to it for underlying physical storage. Overprovisioning is a technique generally used to improve efficiency of operation, typically based on a statistical analysis of actual use of virtual disks 32 by users. At any given time, most users are not consuming the entire capacity 36 of their virtual disks 32, and the rate at which the virtual disks 32 are filling up is generally very slow (e.g., on the order of months or even years). Thus, it is efficient to allocate an amount of physical storage capacity that is expected to be sufficient for expected storage needs over a given time interval, and to have a mechanism for changing the amount of allocated physical storage capacity as may be necessary over time (e.g., increasing it as the usage of the virtual disks 32 grows). As indicated above, known techniques have been used for this purpose that suffer the drawback of requiring intervention of a system operator. The presently disclosed techniques can enable greater automation and attendant benefits.

The exact algorithm for overprovisioning may depend on a variety of factors and may vary among different systems and different operating circumstances. The approach to provisioning involves a balance between efficiency (using the least possible amount of physical storage at any given time) and smooth, responsive operation (minimizing disruptive remapping of virtual disks 32 to storage devices 16). Factors for consideration include the availability and cost of physical storage as well as the expected growth in utilization, number and sizes of the virtual disks 32.

A contrived example is provided for illustration. A system may have a storage device 16 having a capacity 48 of 200 GB for use in storing data of the virtual disks 32 of a number of users. It is assumed that each virtual disk 32 has a capacity 36 of 2 GB, with a typical present utilization 38 of 500 MB and a growth rate of 5% per month. In this case the storage device 16 might be used for 200 such virtual disks, for example, which is workable because the present total virtual disk usage of 100 GB (200×500 MB) is less than the storage device capacity of 200 GB. As usage grows and nears the available capacity of 200 GB, it becomes necessary to take action to maintain adequate physical storage space for this collection of 200 virtual disks. For example, a second 200 GB storage device 16 may be allocated for use, and the 200 virtual disks divided among the two storage devices 16. This action ensures adequate physical storage space for the virtual disks 32, at the expense of the operation of remapping the virtual disks 32 to two storage devices 16. Note that in many cases the remapping is accompanied by physically moving data of remapped virtual disks 32 from one storage device 16 to another, although it may be possible in some systems to split a virtual disk 32 among multiple storage devices 16 in which case existing data may be left in place at the time of the remapping.

Figure 4:
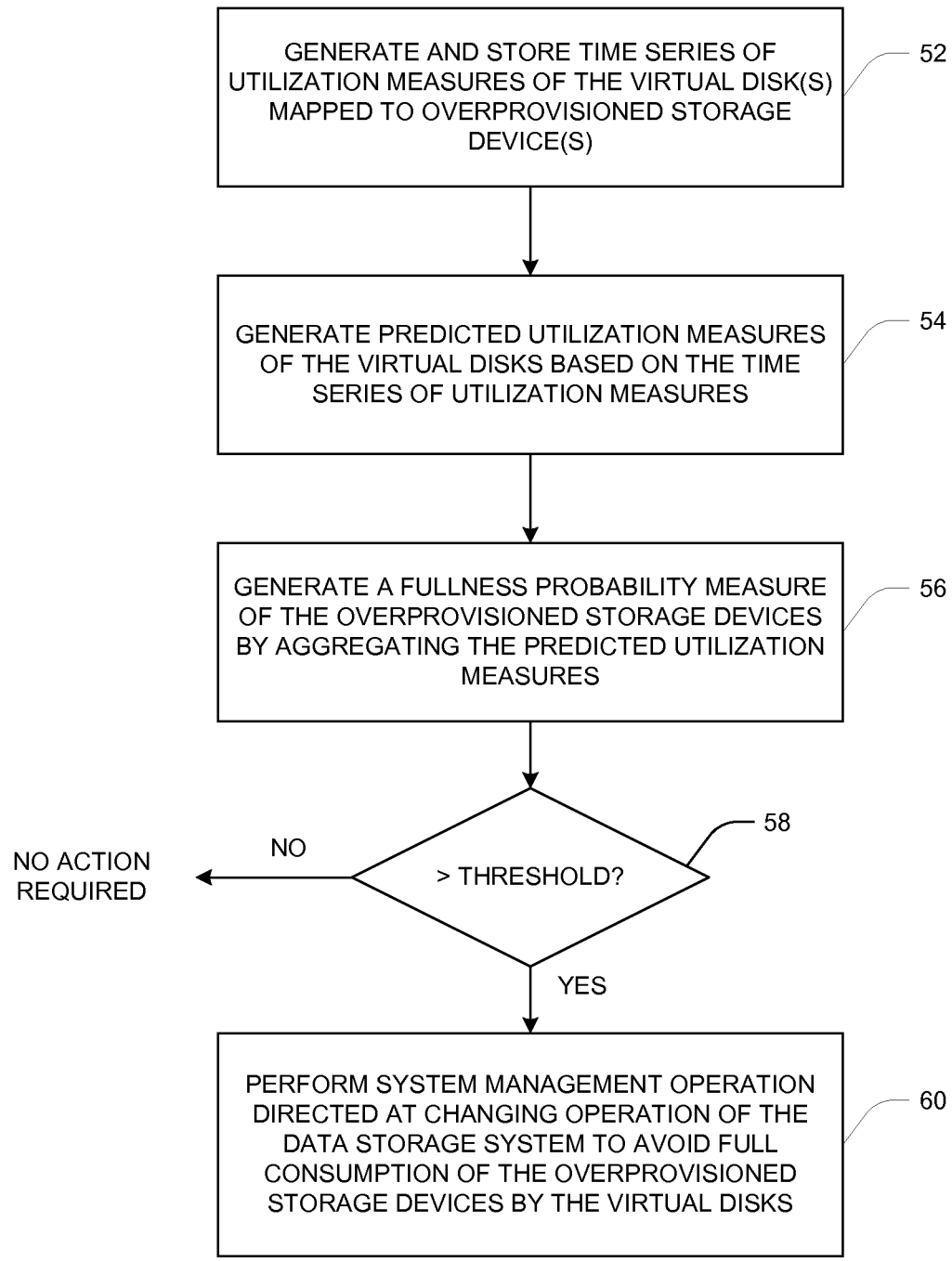
FIG. 4 is a flow diagram depicting operation of a data storage system.

FIG. 4 is a flow diagram description of pertinent operation of the storage system 10, specifically of the mapping I/O controller 34. It is assumed that a set of virtual disks 32 have been defined which are visible to users, and that a mapping of the virtual disks 32 to a set of one or more overprovisioned storage devices 16 of the storage system 10 has been established. The mapping I/O controller 34 carries out user I/O requests for data of the virtual disks 32 by performing corresponding "back-end" I/O requests to the overprovisioned storage device(s) 16 in accordance with the mapping, where "back-end" refers to I/O requests between the computer 12 and the storage devices 16.

At 52, the mapping I/O controller continually generates and stores a set of time series of utilization measures of the set of virtual disks 32. Each utilization measure reflects an amount of a respective virtual disk 32 (size of area 38) consumed by user data at a respective time over a past time interval. There is one time series for virtual disk 32-1, another time series for virtual disk 32-2, etc. One convenient utilization measure is current disk usage stated in a convenient measurement unit such as bytes or blocks (e.g., 500 MB as in the above example).

At 54, predicted utilization measures of the set of virtual disks 32 are generated based on the time series of utilization measures from 52. Each predicted utilization measure is an estimate of an amount of a respective virtual disk 32 expected to be consumed by user data at a future time. This step involves extrapolating from past to future utilization measures, a task that has been extensively studied and for which there are a number of known tools that can be used. One straightforward approach is to assume linear growth over time, and to employ a linear regression technique to estimate utilization at a given time in the future. It will be appreciated that the nature of the workload for which the virtual disk 32 is used may enable selection of an estimation approach that may be more accurate than other approaches. The estimation at 54 may exploit known characteristics of the workload, such as any periodicity or correlation with time or events.

At 56, a fullness probability measure of the set of overprovisioned storage devices 16 is generated by aggregating the predicted utilization measures. The fullness probability measure reflects a probability that the set of overprovisioned storage devices 16 will be fully consumed by user data at the future time for which the estimates were obtained at 54. In one example approach, the fullness probability measure for a storage device 16 may be calculated as follows:

$$p(\text{full}(\text{device},t) = (\text{overhead} + \text{sum}_i(\text{disk}_i \cdot \text{consumed}(t))/ \text{device-capacity}$$

where $\text{disk}_i \cdot \text{consumed}(t)$ is the predicted utilization measure for virtual disk "i", device-capacity is the size of the available capacity 48 of the storage device, and "overhead" is the size of the overhead area 44.

The above equation calculates a probability that a storage device 16 becomes full at a time t as the sum of the predicted utilization measures of all virtual disks 32 mapped to the storage device 16, along with the size of the overhead 42, divided by the capacity 48 of the storage device 16.

At 58, a test is done to determine whether the fullness probability measure is greater than a predetermined threshold value chosen to differentiate between conditions that may require action from those that don't. This threshold value reflects the above-discussed balance between efficiency and non-disruptive operation. If the threshold is not exceeded, then no action is required. Operation may continue using the existing mapping, i.e., nothing is changed. If the threshold is exceeded, then at 60 a system management operation is performed which is directed at changing operation of the data storage system 10 to avoid full consumption of the set of overprovisioned storage devices 16 by the set of virtual disks 32. As an example, the mapping may be automatically changed in a manner that reduces usage of the set of overprovisioned storage devices 16 by the set of virtual disks 32 while permitting continued consumption of the set of virtual disks 32 up to their respective storage capacities 36. The mapping as changed is then used in carrying out subsequent user I/O requests for data of the set of virtual disks 32.

There can be a variety of system management operations that can be performed, including the above-discussed action of allocating another storage device 16 and remapping some of the virtual disks 32 of the set to the new storage device 16. Such an action reduces the number of virtual disks 32 mapped to the first storage device 16 (the one that is the subject of the process of FIG. 4) and makes more unused space 48 available for growth of the used areas 38 of the those virtual disks 32 still mapped to the first storage device 16.

Other potential system management operations include raising an alert to a system operator, perhaps including a recommendation for new proposed mappings that the mapping I/O controller 34 has generated. Another possibility is forcing some virtual disks 32 into a read-only mode to prevent them from consuming additional space (which may be a temporary measure until other long-term action is taken).

It should be noted that in general, a storage device 16 may store data of one or multiple virtual disks 32, and a virtual disk 32 may be confined to one storage device 16 or span multiple storage devices 16. The disclosed technique is generally directed to the prediction of future usage of a set of one or more virtual disks and translating that prediction into a predicated probability of fullness of a set of one or more storage devices on which the virtual disk(s) are stored. It will be appreciated that this operation does not require any particular relationship between the size of a given virtual disk and the size of the underlying storage device.

In one embodiment, arranging for use of an additional storage device 16 may include initiating installation of another storage device 16 in the storage system 10 prior to remapping any virtual disks 32 to the new storage device 16. Installation may be initiated in an anticipatory way, i.e., before the fullness probability measure reaches the threshold, or it may be done in a more reactive manner in response to the fullness probability measure being above the threshold.

The future time for which the fullness probability measure is generated may be selected based on a time required for a new storage device 16 to become available to store user data. This time interval extending from the present to the future time can be seen as a "prediction horizon", and its length may generally track (be linearly related to) the expected time required for new storage resources to become available.

Generating the predicted utilization measures may include performing a predictive calculation using the time series of utilization measures and/or rules or heuristics about one or more applications or systems using the virtual disks. The predictive calculation may be selected from predictions that are purely data-driven, purely heuristic- or rule-driven, and a mixture of data-drive and heuristic- or rule-driven.

While various embodiments of the invention have been particularly shown and described, it will be understood by those skilled in the art that various changes in form and details may be made therein without departing from the scope of the invention as defined by the appended claims.

What is claimed is:

1. A method of operating a computer of a data storage system, the data storage system defining a set of one or more virtual disks visible to users and a mapping of the virtual disks to a set of one or more overprovisioned storage devices of the storage system, the set of overprovisioned storage devices including physical storage media providing physical storage for the set of virtual disks and having an available storage capacity less than a sum of respective storage capacities of the virtual disks, comprising:

satisfying user input-output requests for data of the virtual disks by performing corresponding back-end input-output requests to the set of overprovisioned storage devices in accordance with the mapping;

continually generating and storing a set of time series of utilization measures of the set of virtual disks, each utilization measure reflecting an amount of a respective virtual disk consumed by user data at a respective time over a past time interval;

generating predicted utilization measures of the set of virtual disks based on the time series of utilization measures, each predicted utilization measure being an estimate of an amount of a respective virtual disk expected to be consumed by user data at a future time;

generating a fullness probability measure of the set of overprovisioned storage devices by aggregating the predicted utilization measures, the fullness probability measure reflecting a probability that the set of overprovisioned storage devices will be fully consumed by user data at the future time; and in response to the fullness probability measure being above a predetermined threshold value, performing a system management operation directed at changing operation of the data storage system to avoid full consumption of the set of overprovisioned storage devices by the set of virtual disks.

2. A method according to claim 1, wherein the system management operation includes assigning one or more of the virtual disks to another storage device to cause future input-output requests for data of the one or more virtual disks to be directed to the other storage device rather than to the set of overprovisioned storage devices.

3. A method according to claim 2, wherein the system management operation further includes initiating installation of the other storage device in the storage system prior to assigning the one or more virtual disks to the other storage device.

4. A method according to claim 3, wherein initiating installation is performed in response to the fullness probability measure being above the predetermined threshold value.

5. A method according to claim 2, wherein the future time for which the fullness probability measure is generated is selected based on a time required for the other storage device to become available to store user data.

6. A method according to claim 1, wherein generating the predicted utilization measures is performed based on an assumption of linear growth of utilization of the virtual disks over time.

7. A method according to claim 6, wherein generating the predicted utilization measures includes performing a linear regression based on the time series of utilization measures.

8. A method according to claim 1, wherein generating the predicted utilization measures is performed based on a known correlation of a workload of input-output requests for the set of virtual disks with time or events.

9. A method according to claim 1, wherein generating the fullness probability measure includes accounting for overhead data stored on the set of storage devices, the overhead data pertaining to operation of the virtual disks while being distinct therefrom.

10. A method according to claim 1, wherein generating the predicted utilization measures includes performing a predictive calculation using the time series of utilization measures and/or rules or heuristics about one or more applications or systems using the virtual disks, the predictive calculation being selected from predictions that are purely data-driven, purely heuristic- or rule-driven, and a mixture of data-drive and heuristic- or rule-driven.

11. A computer for use in a data storage system, the data storage system defining a set of one or more virtual disks visible to users and a mapping of the virtual disks to a set of one or more overprovisioned storage devices of the storage system, the set of overprovisioned storage devices including physical storage media providing physical storage for the set of virtual disks and having an available storage capacity less than a sum of respective storage capacities of the virtual disks, comprising:

a processor;

memory;

input-output circuitry for coupling to the users and to the set of overprovisioned storage devices; and interconnect coupling the processor, memory and input-output circuitry together;

wherein the memory contains a set of instructions executable by the processor to cause the computer to define the set of virtual disks and a mapping input-output controller, the mapping input-output controller being operative to:
- satisfy user input-output requests for data of the set of virtual disks by performing corresponding back-end input-output requests to the set of overprovisioned storage devices in accordance with the mapping;
- continually generate and store a set of time series of utilization measures of the set of virtual disks, each utilization measure reflecting an amount of a respective virtual disk consumed by user data at a respective time over a past time interval;
- generate predicted utilization measures of the set of virtual disks based on the time series of utilization measures, each predicted utilization measure being an estimate of an amount of a respective virtual disk expected to be consumed by user data at a future time;
- generate a fullness probability measure of the set of overprovisioned storage devices by aggregating the predicted utilization measures, the fullness probability measure reflecting a probability that the set of overprovisioned storage devices will be fully consumed by user data at the future time; and
- in response to the fullness probability measure being above a predetermined threshold value, performing a system management operation directed at changing operation of the data storage system to avoid full consumption of the set of overprovisioned storage devices by the set of virtual disks.

12. A computer according to claim 11, wherein the system management operation includes assigning one or more of the set of virtual disks to another storage device to cause future input-output requests for data of the one or more virtual disks to be directed to the other storage device rather than to the set of overprovisioned storage devices.

13. A computer according to claim 12, wherein the system management operation further includes initiating installation of the other storage device in the storage system prior to assigning the one or more virtual disks to the other storage device.

14. A computer according to claim 13, wherein installation is initiated in response to the fullness probability measure being above the predetermined threshold value.

15. A computer according to claim 12, wherein the future time for which the fullness probability measure is generated is selected based on a time required for the other storage device to become available to store user data.

16. A computer according to claim 11, wherein generating the predicted utilization measures is performed based on an assumption of linear growth of utilization of the virtual disks over time.

17. A computer according to claim 16, wherein generating the predicted utilization measures includes performing a linear regression based on the time series of utilization measures.

18. A computer according to claim 11, wherein generating the predicted utilization measures is performed based on a known correlation of a workload of input-output requests for the set of virtual disks with time or events.

19. A computer according to claim 11, wherein generating the fullness probability measure includes accounting for overhead data stored on the set of storage devices, the overhead data pertaining to operation of the set of virtual disks while being distinct therefrom.

20. A computer according to claim 11, wherein generating the predicted utilization measures includes performing a predictive calculation using the time series of utilization measures and/or rules or heuristics about one or more applications or systems using the set of virtual disks, the predictive calculation being selected from predictions that are purely data-driven, purely heuristic- or rule-driven, and a mixture of data-drive and heuristic- or rule-driven.

21. A method according to claim 1, further comprising:
selecting the future time based on a prediction horizon comprising a time interval extending from a present time to the future time, wherein the prediction horizon has a length determined by a time required to re-map the virtual disks at least in part to another storage device and physically move at least a portion of the user data stored on the over-provisioned storage devices to the other storage device to reduce how many of the virtual disks in the set of virtual disks are mapped to the over-provisioned storage device.

22. A method according to claim 21, wherein performing the system management operation includes re-mapping the virtual disks at least in part to another storage device, physically moving at least a portion of the user data stored on the over-provisioned storage devices to the other storage device to reduce how many of the virtual disks in the set of virtual disks are mapped to the over-provisioned storage device, and forcing at least one of the virtual disks into a read-only mode until the virtual disks are re-mapped to the other storage device.

* * * * *